United States Patent
Kim et al.

(10) Patent No.: US 8,208,948 B2
(45) Date of Patent: Jun. 26, 2012

(54) METHOD AND APPARATUS FOR SELECTING A LOCATION PLATFORM FOR A USER EQUIPMENT TO ROAM AND METHOD FOR DETERMINING A LOCATION OF A USER EQUIPMENT USING THE SAME

(75) Inventors: Wuk Kim, Gwacheon-si (KR);
Joo-Young Kim, Suwon-si (KR);
Joon-Goo Park, Yongin-si (KR);
Sang-Kyung Sung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 429 days.

(21) Appl. No.: 11/130,485

(22) Filed: May 17, 2005

(65) Prior Publication Data

US 2005/0255857 A1 Nov. 17, 2005

(30) Foreign Application Priority Data

May 17, 2004 (KR) ........................ 10-2004-0034608

(51) Int. Cl.
*H04W 24/00* (2009.01)
(52) U.S. Cl. .................. 455/456.5; 455/456.2
(58) Field of Classification Search .................. 455/561, 455/456.1–457, 432.1–432.3, 404.1–404.2, 455/435.1, 433, 435.2, 436–443; 370/331, 370/328
See application file for complete search history.

(56) References Cited

U.S. PATENT DOCUMENTS

| 6,198,933 | B1 | 3/2001 | Lundin | |
|---|---|---|---|---|
| 7,116,990 | B2 * | 10/2006 | Maanoja | 455/456.2 |
| 7,218,940 | B2 * | 5/2007 | Niemenmaa et al. | 455/456.1 |
| 7,245,910 | B2 * | 7/2007 | Osmo | 455/432.1 |
| 7,376,430 | B2 * | 5/2008 | Matsuda | 455/456.2 |
| 7,424,293 | B2 * | 9/2008 | Zhu | 455/432.1 |
| 7,796,993 | B2 * | 9/2010 | Kim et al. | 455/436 |
| 7,881,731 | B2 * | 2/2011 | Kim et al. | 455/456.2 |
| 2002/0123354 | A1 * | 9/2002 | Nowak | 455/456 |
| 2004/0229632 | A1 * | 11/2004 | Flynn et al. | 455/456.3 |

FOREIGN PATENT DOCUMENTS

KR 1020010012311 2/2001

* cited by examiner

*Primary Examiner* — Brandon Miller
(74) *Attorney, Agent, or Firm* — The Farrell Law Firm, P.C.

(57) ABSTRACT

A method and an apparatus for selecting a location platform for a user equipment to roam and a method for determining the location of the user equipment using the same. The method for selecting a location platform includes: checking a visiting network of the UE in response to a location request message transmitted from the UE which is roaming; and selecting a location platform to calculate a location of the UE by comparing positioning capability information of the checked visiting network and positioning capability information of a home network of the UE. According to such a method, it is possible to efficiently perform the positioning of the UE, regardless of the location of the UE, thereby improving the quality of the positioning service.

22 Claims, 5 Drawing Sheets

| VARIABLE | | PROPERTY | DESCRIPTION |
|---|---|---|---|
| Network ID | | M | NETWORK ID |
| LP ID | | M | LOCATION PLATFORM ID |
| Type of Network | | M | CDMA, GSM, 3G NETWORK, WLAN, ETC |
| Roaming Location Service Support | | M | WHETHER OR NOT TO SUPPORT ROAMING LOCATION SERVICE |
| Positioning Method Support | Cell ID | M | WHETHER OR NOT TO SUPPORT POSITIONING BASED ON CELL ID |
| | Accuracy | O | DEGREE OF ACCURACY (m) |
| | Network-based Method | M | WHETHER OR NOT TO SUPPORT POSITIONING BASED ON NETWORK SUCH AS TOA, TDOA, ETC |
| | Accuracy | O | DEGREE OF ACCURACY (m) |
| | Assisted GPS | M | WHETHER OR NOT TO SUPPORT ASSISTED GPS-BASED POSITIONING |
| | Accuracy | O | DEGREE OF ACCURACY (m) |
| Assisted GPS Info. | | O | A-GPS SUPPORT INFORMATION |
| Coverage Area | | O | AREA CODE |
| MS-Based I MS-Assisted | | M | INFORMATION ABOUT LOCATION CALCULATION UNIT |
| Control Plane I User Plane | | M | A-GPS SUPPORT INFORMATION (CONTROL PLANE & USER PLANE) |

FIG.6

METHOD AND APPARATUS FOR SELECTING A LOCATION PLATFORM FOR A USER EQUIPMENT TO ROAM AND METHOD FOR DETERMINING A LOCATION OF A USER EQUIPMENT USING THE SAME

PRIORITY

This application claims to the benefit under 35 U.S.C. 119(a) of an application entitled "Method and Apparatus for Selecting Location Platform for User Equipment to Roam and Method for Determining Location of User Equipment using The Same" filed in the Korean Intellectual Property Office on May 17, 2004 and assigned Serial No. 2004-34608, the entire contents of which is incorporated herein by reference.

BACKGROUND OF THE INVENTION

1. Field of the Invention

The present invention relates generally to a mobile communication system, and more particularly to an apparatus and a method for determining a location of a user equipment (UE).

2. Description of the Related Art

Recently, the wide spread use of UEs has expanded throughout the world. Further, in a global mobile communication system, many users want to receive application services (e.g., traffic, daily information, etc.) using location information of UEs equipments. Accordingly, user location information acquisition systems using UEs have been commercialized in some countries and mobile communication network areas (e.g., SK telecom and KTF in Korean mobile communication network area, and NTT, DoCoMo, Sprint PCS, KDDI, Vodafone in Japan and Western mobile communication network areas).

In order to provide application services using location information, it is necessary to determine a location of a UE in advance. That is, the application services using location information are created on the basis of geographical position information of a UE, which is determined from the location of the UE.

In order to acquire the geographical position information of a UE, the UE must receive a positioning service, regardless of the location of the UE. That is, the UE must receive the positioning service, regardless of whether the UE is located in a home area or a roaming area.

The positioning service is provided by a location platform (LP) contained in a network. For example, a home location platform (HLP) contained in a home network or a visiting location platform (VLP) contained in a roaming network provides auxiliary location information (e.g., auxiliary GPS information) to the UE or performs a location calculation using information received from the UE, in order to provide the positioning service.

The location of a UE in the mobile communication network can be determined by various ways, including three representative examples, which will be described below.

First, the location of a UE can be determined for each cell by using information of the cell nearest to the location of the UE or by using information of the cell managing the UE.

Second, the location of a UE can be determined based on the network. In this network-based positioning, intensity of transmission and reception signals between a node B (or base station), a UE a time-of-arrival (TOA) of a radio wave signal transmitted from the node B to the UE, or a time-difference-of-arrival (TDOA) of a radio wave signal between the UE each of multiple node Bs is calculated. Thereafter, triangulation is performed using the TOA or TDOA, in order to determine the location of the UE.

Third, the location of a UE can be determined by using a global positioning system (GPS) developed by the U.S. Department of Defense.

From among the above-described positioning schemes, the positioning scheme using the GPS is employed in the mobile communication network together with supplementation of the GPS technique. Such a positioning scheme using a supplemented GPS is called a network assisted GPS (NA-GPS). The NA-GPS transmits auxiliary GPS information, which is necessary to determine the location of a UE using a network (particularly, using the mobile communication network), to the UE, thereby shortening the time-to-first-fix (TTFF) of the UE.

The auxiliary GPS information transmitted to the UE in a network includes satellite IDs of the respective satellites, almanac data, satellite orbit information, a clock error correction value, an ionosphere correction value, a differential GPS (DGPS) correction value, and a list of invisible satellites. The almanac data is location information (e.g., a model) of a satellite according to time sections for a predetermined time period, which is used to detect an approximate location of the satellite, particularly to distinguish a visible satellite. The satellite orbit information and the clock error correction value are information for providing an accurate model of a satellite location to a UE. The ionosphere correction value is used to correct an ionosphere delay error, which occurs when a radio signal passes through an ionosphere contained in a pseudo distance between a satellite and a UE, by about 50%. The ionosphere correction value changes slower than other information.

The DGPS correction value improves the accuracy of a UE location, by enabling a basic node B to calculate and remove a deviation error contained in the pseudo distance. The almanac data, the satellite orbit information, the clock error correction value, and the DGPS correction value must be determined according to satellites.

FIG. 1 is a block diagram schematically illustrating a conventional mobile communication system. More specifically, FIG. 1 illustrates a mobile location service (MLS) system for determining the location of a UE in a mobile communication network. The mobile communication system for determining the location of a UE includes a UE 110, a node B (or base station) 120, a radio network controller (RNC) 130, a home location platform (HLP) 140, a core network (CN) 150 and a mobile location service client (MLS client) 160.

The node B 120 transmits a radio wave signal to the UE 110 located in a specific cell. Also, the node B 120 measures a radio wave signal received from the UE 110, and transmits predetermined data (e.g., TODA) required to determine the location of the UE 110 to the RNC 130. In this case, a Uu interface is used for communication between the node B 120 and the UE 110.

The RNC 130 manages the radio resources of the node B 120, controls a procedure for determining the location of the UE 110, and performs location calculation. In this case, an Iub interface is used for communication between the RNC 130 and the node B 120.

The HLP 140, which is also called a location platform (or location server), provides auxiliary location information to the UE 110, and performs a location information service by performing location calculation and the like. For example, the HLP 140 transmits the auxiliary GPS information to the UE 110, which is one of the auxiliary location information, thereby enabling a network-assisted GPS service to be provided to UEs 110 located in a relevant network.

The CN 150 manages information about the UEs 110 and performs mobility management, session management, and call management. Accordingly, the CN 150 and the RNC 130 communicate with each other using an Iu interface.

The MLS client 160 is connected to the network and provides a service in relation to locations of the UEs 110. That is, the MLS client 160 requests location information of a specific UE 110 from the CN 150 and provides a location service to the relevant UE 110 using the location information. In this case, the MLS client 160 and the CN 150 communicate with each other using an Le interface.

In the above-described system of FIG. 1, when the UE 110 is located in a home network, the UE 110 receives auxiliary location information (e.g., auxiliary GPS information) from the HLP 140 contained in the home network. The HLP 140 may calculate the location of the UE 110, i.e., the location of the UE 110 is determined by the HLP 140.

Referring to FIG. 2, when the UE 110 roams from a home network 100 to another network 200, i.e., when the UE 110 visits another network 200, the UE 110 may determine the location of the UE 110, by using either a visiting location platform (VLP) 240 contained in the network 200 (in which the UE 110 is roaming) or the HLP 140 contained in the home network 100.

However, in order to determine the location of a roaming UE 110 using the VLP 240, the VLP 240 must be able to have a positioning capability, such as information about whether or not various positioning schemes according to required location accuracy are supported and information about whether or not an assisted GPS (A-GPS) scheme in a control plane and a user plane is supported, according to a request of the UE 110, and personal location information of the UE 110 must be kept secret. Therefore, when the roaming UE 110 requests auxiliary location information for determining a location in a user-plane A-GPS scheme, the positioning scheme using the VLP 240 may cause a number of problems. That is, if the VLP 240 supports only a control-plane A-GPS scheme, the VLP 240 cannot provide auxiliary GPS information to the UE 110. Further, there is another problem in that the personal location information of the UE 110 is disclosed as soon as the positioning service begins between the VLP 240 and the UE 110.

In order to determine the location of a roaming UE 110 using the HLP 140, a regional range where the HLP 140 can provide auxiliary location information (e.g., auxiliary GPS information) must include a visiting area where the UE 110 is located.

In addition, although the positioning scheme using the HLP 140 has a superior capability in security and protection of personal location information, the positioning scheme using the HLP 140 has a disadvantage in that the accuracy of auxiliary location information (or auxiliary GPS information) is poor, as compared with the case of using the VLP 240. Therefore, in order to improve the quality of the positioning service, it is preferred that the UE 110 selects a location platform in consideration of both the positioning capability of the HLP 140 or the VLP 240, and capability factors requested by the UE 110, e.g., location accuracy, protection of personal location information, security, etc.

However, until now, there has been no such a method capable of permitting a roaming UE 110 to select a location platform in consideration of the above-described positioning capability and capability factors requested by the UE 110, in order to determine the location of the UE 110.

SUMMARY OF THE INVENTION

Accordingly, the present invention has been designed to solve the above and other problems occurring in the prior art.

An object of the present invention is to provide an apparatus and a method for improving the quality of a positioning service, regardless of the location of a user equipment.

Another object of the present invention is to provide an apparatus and a method for enabling the position of a roaming user equipment to be efficiently determined.

Still another object of the present invention is to provide an apparatus and a method for selecting a location platform in consideration of both the positioning capability of a location platform and positioning capability factors requested by a user equipment.

Still another object of the present invention is to provide an apparatus and a method for determining the location of a user equipment using a location platform, which is selected by the above-mentioned apparatus and method.

To accomplish the above and objects, in accordance with one aspect of the present invention, there is provided a method for selecting a location platform for a user equipment (UE), which is roaming. The method includes the steps of: checking a visiting network of the UE in response to a location request message transmitted from the UE which is roaming; and selecting a location platform to calculate a location of the UE by comparing positioning capability information of the checked visiting network and positioning capability information of a home network of the UE.

In accordance with another aspect of the present invention, there is provided a location platform selection apparatus for a user equipment (UE), wherein the location platform selection apparatus compares positioning capabilities information of a home location platform of the UE and a visiting location platform in response to a location information request of the UE which is in roaming, and selects a location platform to calculate a location of the UE. The visiting location platform is contained in a visiting network in which the UE is visiting.

In accordance with still another aspect of the present invention, there is provided a method for determining a location of a user equipment (UE). The method includes the steps of: checking a visiting network of the UE in response to a location request message transmitted from the UE which is roaming; selecting a location platform to calculate a location of the UE by comparing positioning capability information of the checked visiting network and positioning capability information of a home network of the UE; acquiring auxiliary information for calculating the location of the UE in the selected location platform by exchanging auxiliary location information between the selected location platform and the UE; and calculating the location of the UE using the acquired auxiliary information.

BRIEF DESCRIPTION OF THE DRAWINGS

The above and other objects, features, and advantages of the present invention will be more apparent from the following detailed description taken in conjunction with the accompanying drawings, in which:

FIG. 6 illustrates an example of positioning capability information that is used as a criterion for selecting a location platform for the a UE according to an embodiment of the present invention.

DETAILED DESCRIPTION OF THE PREFERRED EMBODIMENT

Preferred embodiments of the present invention will be described in detail herein below with reference to the accompanying drawings. In the following description of the embodiments of the present invention, a detailed description of known functions and configurations incorporated herein will be omitted when it may obscure the subject matter of the present invention.

Figure 1:
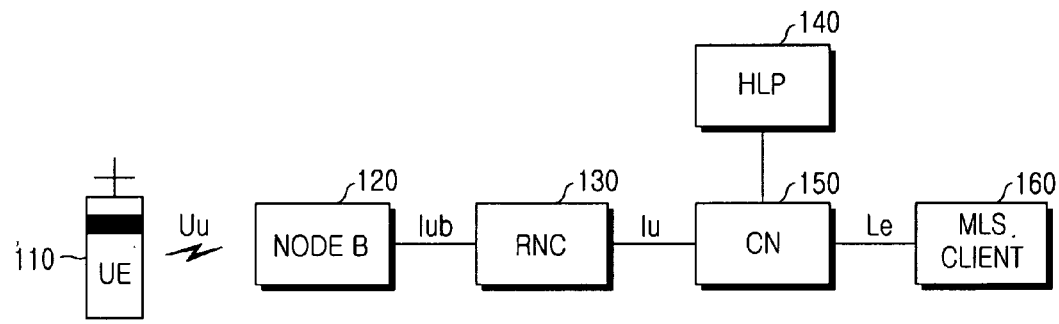
FIG. 1 is a block diagram schematically illustrating a conventional mobile communication system.
Figure 2:
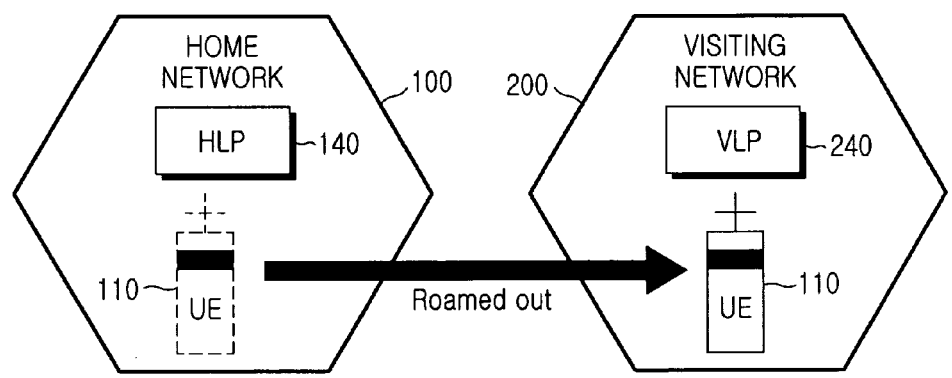
FIG. 2 is a block diagram illustrating a roaming state of a user equipment (UE)
Figure 3:
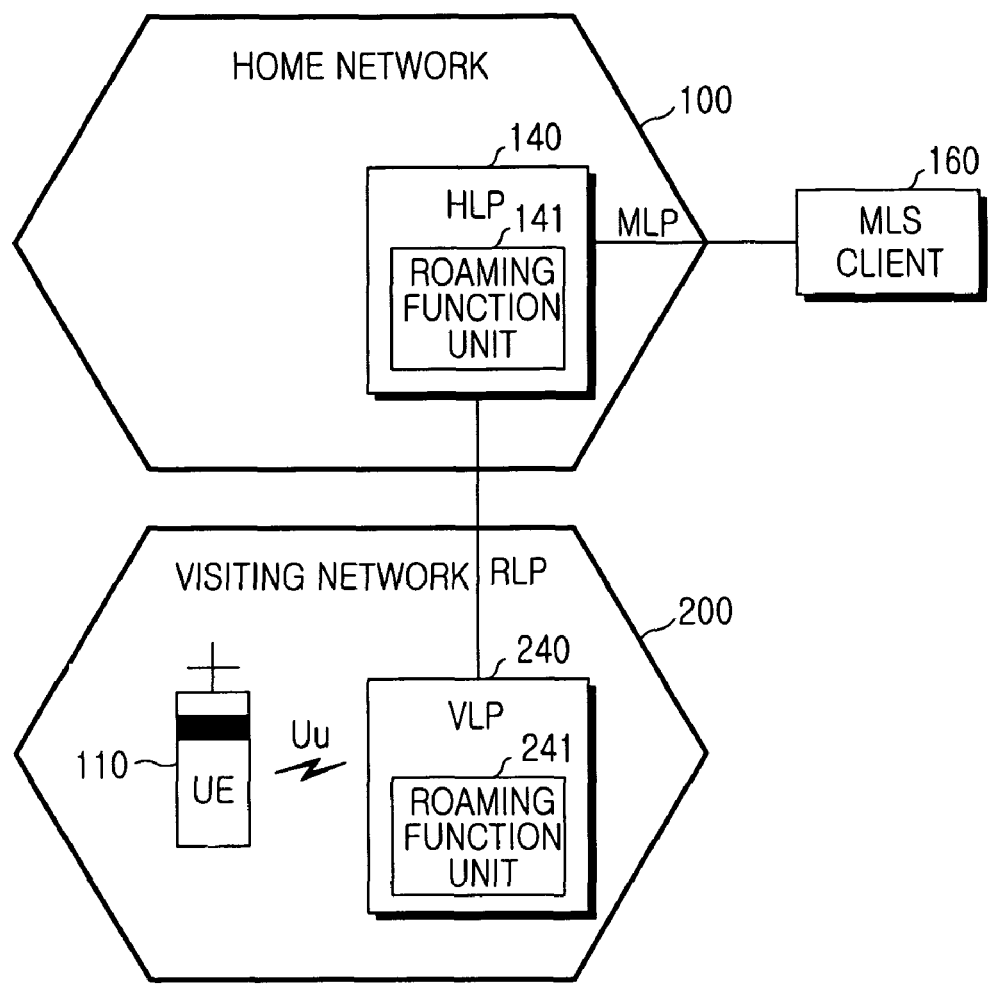
FIG. 3 is a block diagram illustrating a system for determining a position of a roaming UE according to an embodiment of the present invention.

FIG. 3 is a block diagram illustrating a system for determining a position of a roaming UE according to an embodiment of the present invention. Referring to FIG. 3, the system includes two location platforms, i.e., a home location platform (HLP) 140, which is included in a home network 100 of a UE 110, and a visiting location platform (VLP) 240, which is included in a visiting network 200 of the UE 110. The system manages positioning information of the UEs located in each network and provides a positioning service. Herein, it is preferred that the HLP 140 and the VLP 240 communicate with each other using a roaming location protocol (RLP).

The HLP 140 of the home network 100 includes a home-roaming function unit 141, and the VLP 240 of the visiting network 200 in which the UE 110 is roaming includes a visiting-roaming function unit 241. The home-roaming function unit 141 and the visiting-roaming function unit 241 perform preparatory work for calculating the position of the roaming UE 110 and determine a location platform for performing position calculation. That is, the home-roaming function unit 141 compares the positioning capability of the HLP 140 and the positioning capability of the VLP 240, in order to select a location platform to be used for the positioning service. The visiting-roaming function unit 241 provides positioning capability information of the VLP 240 in response to a request of the home-roaming function unit 141.

A mobile location service client (MLS client) 160 located out of the network requests position information of the UE 110 to the HLP 140 in the home network 100. Herein, it is preferred that the MLS client 160 and the HLP 140 communicate with each other using a mobile location protocol (MLP).

Figure 4:
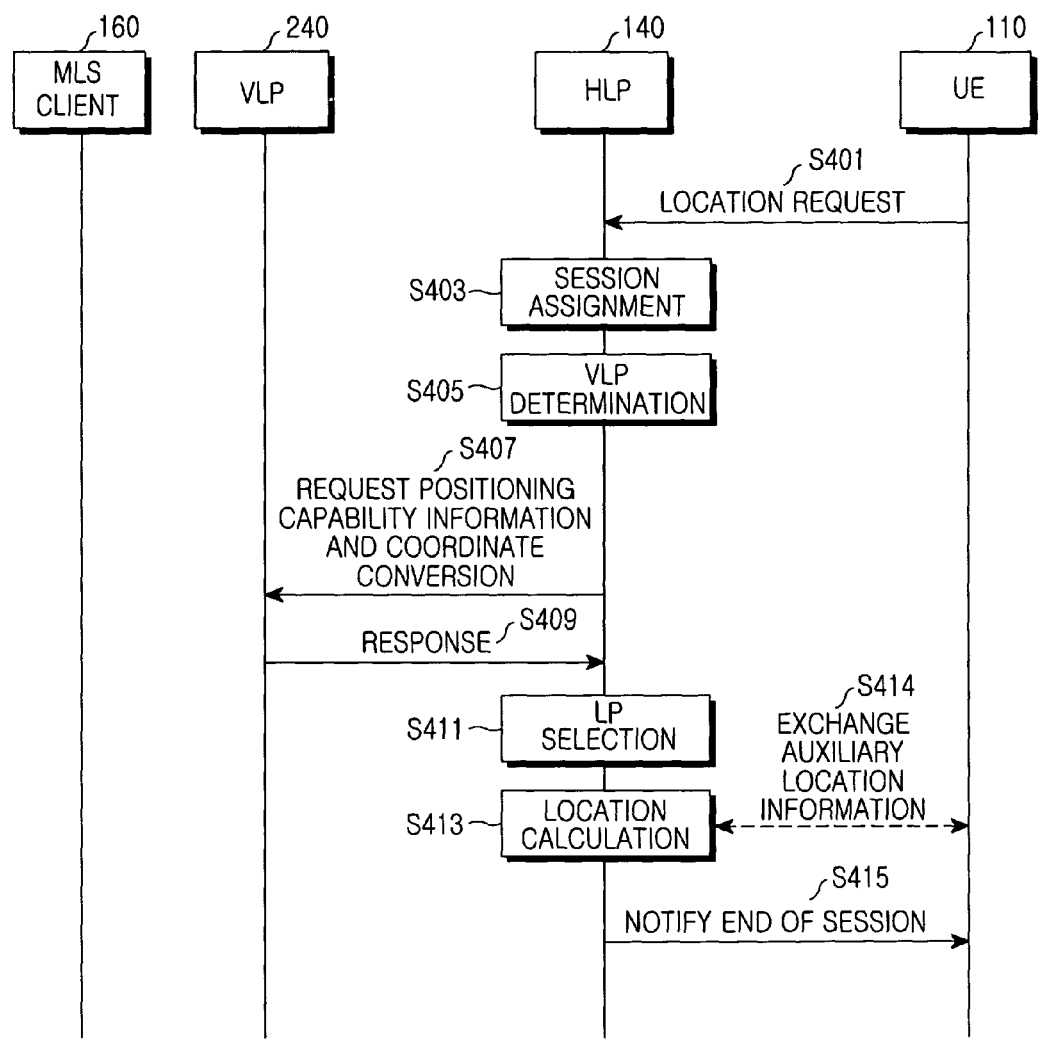
FIG. 4 is a flow diagram illustrating a procedure for determining a position of a UE according to an embodiment of the present invention.

FIG. 4 is a flow diagram illustrating a procedure for determining a position of the UE 110 according to an embodiment of the present invention. More specifically, FIG. 4 illustrates the HLP 140 being selected as a location platform to provide the positioning service when the UE 110 requests information about its own location.

In step S401, the UE 110 in roaming transmits a location request message to the HLP 140 in order to determine its own location. In this case, the location request message is provided to begin a location session and a location procedure between the HLP 140 and the UE 110. The location request message includes an identifier (MS-ID) of the UE 110, positioning capability information of the UE 110, a specific identifier (location ID) of a cell or an area in which the UE 110 is located, an identifier (MLS-client-ID) of a service client to perform a service requested by the UE 110, etc.

The positioning capability of the UE 110 includes positioning schemes supported by the UE 110. That is, the positioning capability of the UE 110 includes characteristics of bearer such as GSM, CDMA, and WLAN, information about a subject to perform location calculation such as MS-Based, MS-Assisted, etc., whether or not a control-plane A-GPS and a user-plane A-GPS are supported.

The HLP 140 having received the location request message checks the identifier of the UE 110 contained in the location request message, and determines if the UE 110 can receive the location service. When it is determined that the UE 110 can receive the location service, the HLP 140 assigns a new session to the UE 110 in step S403. In step S405, the HLP 140 determines the VLP 240 as a location platform with reference to the location ID contained in the location request message.

In step S407, the HLP 140 requests information about the positioning capability of the VLP 240 and conversion of the coordinates (xy coordinates) of the location ID of an area reported by the UE 110, from the VLP 240 determined in step S405, using a start roaming location immediate request (SRLIR) message of the RLP. The SRLIR message includes a session identifier (ID) of a session assigned in step S403, a location ID, and a positioning capability information request symbol (LPC req.: Location Platform Capability request). In this case, the coordinates converted by the request are used in place of the location of a node B. That is, a location platform (LP), which determines the location of the UE 110, generates auxiliary location information using an approximate location of the UE 110 (e.g., a location of a node B in which the UE 110 is located) and provides the auxiliary location information to the UE 110.

In step S409, the VLP 240, having received the SRLIR message in step S407, responds to the HLP (Home Location Platform) 140 using a start roaming location immediate answer (SRLIA) message of the RLP. The SRLIA message includes the session ID, information about a positioning capability (e.g., LP capability), and approximate coordinate information (e.g., coarse position) of the location ID.

An example of information about the positioning capability (LP capability) contained in the SRLIA message is illustrated in FIG. 6. However, this information will be described later in more detail with reference to FIG. 6.

The HLP 140, having received the SRLIA message (response message) from the VLP 240 in step S409, compares the positioning capability (LP capability) information of the VLP 240 contained in the SRLIA message with positioning capability (LP capability) information of the HLP 140 stored in advance in the HLP 140, and selects a location platform to provide a location information service to the UE 110 in step S411.

For example, when it is possible for the HLP 140 to support the user-plane A-GPS positioning scheme but it is impossible for the VLP 240 to support the user-plane A-GPS positioning scheme, the HLP 140 selects the HLP 140 as a location platform. However, when it is impossible for the HLP 140 to support the user-plane A-GPS positioning scheme but it is possible for the VLP 240 to support the user-plane A-GPS positioning scheme, the HLP 140 selects the VLP 240 as a location platform. When both of the HLP 140 and the VLP 240 can support the user-plane A-GPS positioning scheme, the HLP 140 selects one of the HLP 140 and the VLP 240 as a location platform, by comparing protection of personal location information, charge, security, positioning capabilities, etc., between the HLP 140 and the VLP 240.

When the HLP 140 already has information about the positioning capability of the VLP 240, the HLP 140 selects a location platform using the already-known positioning capability information. Here, it is possible to omit the items for the positioning capability information included in the SRLIR and SRLIA messages transmitted in steps S407 and S409.

FIG. 4 illustrates the HLP 140 being selected as a location platform in step S411. Therefore, the HLP 140, having been determined as a location platform, calculates the location of the UE 110 using auxiliary location information of the UE 110 in step S413.

Accordingly, the HLP 140 exchanges auxiliary location information with the UE 110 in step S414. Herein, the HLP 140 acquires auxiliary location information using either an MS-assisted scheme or an MS-based scheme, and calculates the position of the UE 110 using the acquired auxiliary location information. The MS-assisted scheme calculates auxiliary location information (e.g., estimated value of location) using a measured value received from the UE 110, and the MS-based scheme acquires an auxiliary location information (e.g., estimated value of location) calculated from the UE 110.

After completing the location calculation, the HLP 140 ends the session (e.g., a location session) assigned in step S403 and notifies the UE 110 of the end of the session in step S415. Accordingly, the HLP 140 transmits a positioning end message to the UE 110, and then the UE 110 releases the occupation of all resources, which the UE 110 has occupied in relation to the location session.

Figure 5:
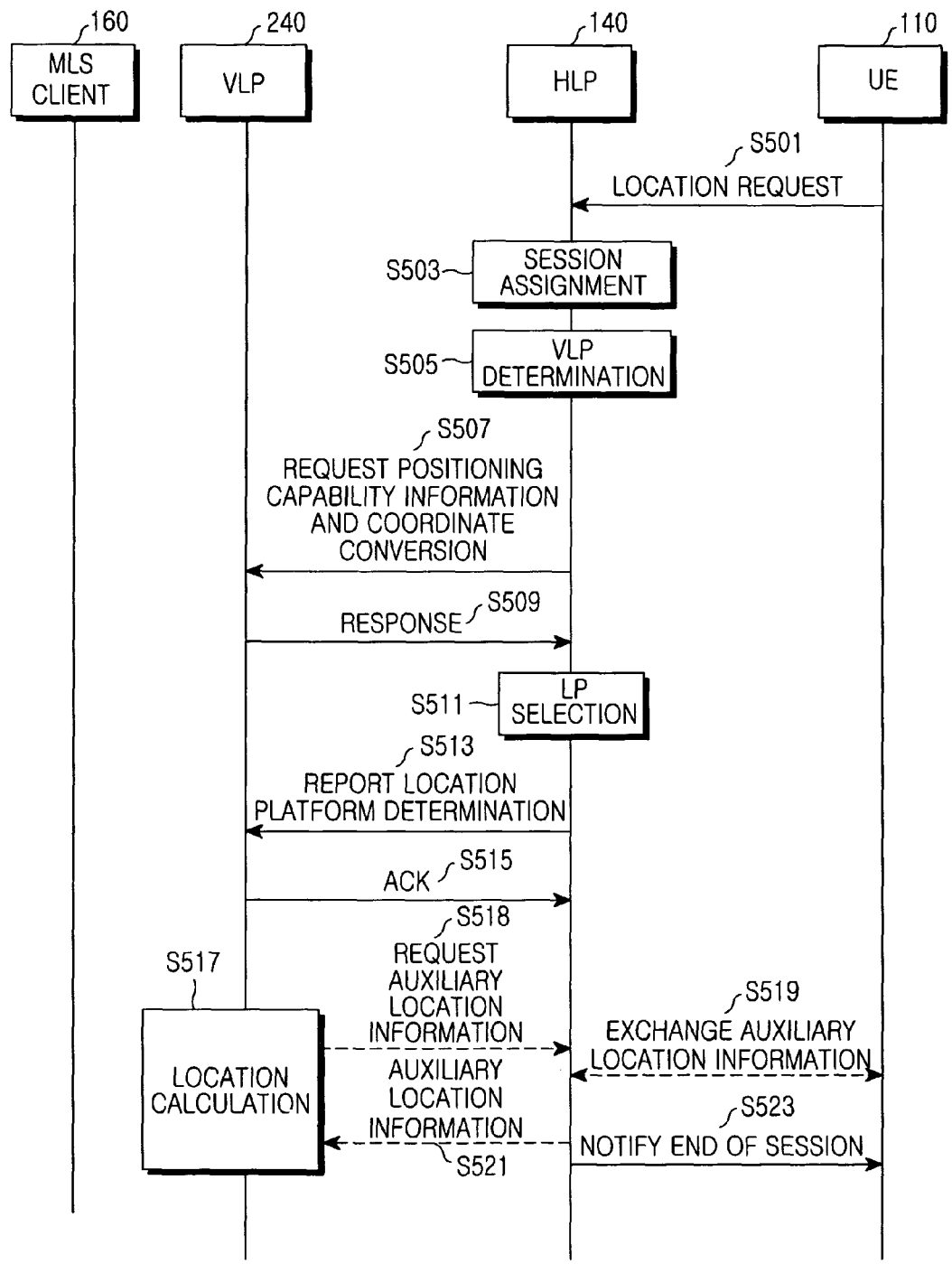
FIG. 5 is a flow diagram illustrating a procedure for determining a position of a UE according to an embodiment of the present invention.

FIG. 5 is a flow diagram illustrating a procedure for determining a position of a UE 110 according to an embodiment of the present invention. More specifically, FIG. 5 illustrates the VLP 240 being selected as a location platform to provide the positioning service when the UE 110 requests information about its own location. However, because steps S501 to S511 in FIG. 5 are the same as steps S401 to S411 in FIG. 4, the detailed description of steps S501 to S511 will be omitted and the following description will be made with regard to the steps following step S511.

Referring to FIG. 5, the HLP 140 determines the VLP 240 as a location platform in step S511, and the HLP 140 notifies the relevant VLP 240 that the VLP 240 has been determined as a location platform in step S513. After the HLP 140 notifies the relevant VLP 240 of the location platform determination, the HLP 140 receives an acknowledgment signal (ACK) in response to the notification in step S515.

The VLP 240, having received the notification of the location platform determination, calculates the location of the UE 110 using auxiliary location information of the UE 110 in step S517.

Accordingly, the VLP 240 performs an auxiliary location information exchange process with the UE 110 via the HLP 140. That is, when the VLP 240 requests auxiliary location information the HLP 140 in step S518, the HLP 140 obtains the auxiliary location information through auxiliary location information exchange with the UE 110 in step S519 and transmits the obtained auxiliary location information to the VLP 240 in step S521. Then, the VLP 240 calculates the location of the UE 110 using the auxiliary location information.

In this case, the VLP 240 acquires auxiliary location information using either an MS-assisted scheme or an MS-based scheme, and calculates the position of the UE 110 using the acquired auxiliary location information. Herein, the MS-assisted scheme calculates auxiliary location information (e.g., estimated value of location) using a measured value received from the UE 110, and the MS-based scheme acquires an auxiliary location information (e.g., estimated value of location) calculated from the UE 110.

After the location calculation is completed, the HLP 140 ends the session (e.g., a location session) assigned in step S503 and notifies the UE 110 of the end of the session in step S523. The HLP 140 transmits a positioning end message (location END message) to the UE 110, and the UE 110 releases the occupation of all resources, which the UE 110 has occupied in relation to the location session.

Although the embodiments of the present invention described above with reference to FIGS. 4 and 5 are made with respect to the case in which a UE requests information about its own location, the above-described procedures of the present invention can also be used when a network requests the location information of a UE. In such a case in which a network requests the location information of a UE, there is little difference except that the subject of location request and the object of session end notification change. Therefore, embodiments for the case in which a network request the location information of a UE will be omitted.

FIG. 6 illustrates an example of positioning capability information that is used as a criterion for selecting a location platform for the a UE according to an embodiment of the present invention. The positioning capability information includes a network identifier (ID), a specific identifier (LP ID) of a location platform, a type of network, information about whether or not a roaming location service is supported, a supported positioning scheme (e.g., a cell ID positioning scheme, a network-based positioning scheme, such as TDOA and the like, a GPS positioning scheme, etc.), a degree of accuracy of each positioning scheme, and information about an A-GPS positioning scheme, which includes a kind of supported A-GPS (a control-plane A-GPS or a user-plane A-GPS) and an auxiliary location information generation scheme (MS-based, MS-assisted, etc.).

As described above, according to an embodiment of the present invention, a location platform is selected based on the positioning capability of the location platform and positioning capability factors requested by a UE, and the location of the UE is determined using the selected location platform. Therefore, the present invention can efficiently perform the positioning of the UE, regardless of the location of a UE (e.g., regardless of whether the UE is located in a home area or a roaming area), thereby improving the quality of the positioning service.

While the present invention has been shown and described with reference to certain preferred embodiments thereof, it will be understood by those skilled in the art that various changes in form and details may be made therein without departing from the spirit and scope of the present invention as defined by the appended claims. Accordingly, the scope of the present invention is not to be limited by the above embodiments, but by the following claims and the equivalents thereof.

What is claimed is:

1. A method for calculating a location of a user equipment (UE) that is roaming, the method comprising the steps of:

receiving, by a home location platform (HLP), a location request message from the UE, including specific identifier information of an area in which the UE is located and positioning capability information including positioning schemes which the UE supports;

determining, by the HLP having received the location request message from the UE, a visiting location platform (VLP) where the UE is located, by referring to information included in the location request message, the VLP being a location platform to calculate the location of the UE;

transmitting the specific identifier information and the positioning capability information received from the UE to the VLP; and receiving the location of the UE calculated from the VLP, the VLP calculating the location of the UE with the positioning scheme corresponding to the positioning capability information received from the UE.

2. The method as claimed in claim 1, further comprising:
receiving by the HLP, an auxiliary location information from the VLP, when the VLP is determined as a location platform, and transmitting the auxiliary location information to the UE;
receiving, from the UE, auxiliary location information by exchange of auxiliary location information with the UE, and transmitting, to the VLP, the auxiliary location information; and
calculating, by the VLP, the location of the UE by using the received auxiliary location information.

3. The method as claimed in claim 1, wherein one of the HLP and the VLP is selected as the location platform in response to the location request message of the UE.

4. The method as claimed in claim 3, wherein a location platform selection apparatus is included in each location platform included in networks.

5. The method as claimed in claim 1, wherein the positioning capability information includes a type of network, information indicating if a roaming location service is supported, a supported positioning scheme, a degree of accuracy of the positioning scheme, and an assisted global positioning system (A-GPS) positioning scheme.

6. The method as claimed in claim 1, further comprising notifying the VLP that the VLP is determined as a location platform to calculate the location of the UE, when the VLP is selected as the location platform.

7. The method as claimed in claim 1, wherein the VLP determined as the location platform receives the positioning capability information provided by the UE through the HLP and calculates the location of the UE by using the positioning capability information.

8. The method as claimed in claim 1, wherein when receiving the location of the UE calculated from the VLP, the positioning scheme is a Mobile Station (MS) assisted scheme represents a scheme of calculating auxiliary location information using a measured value received from the UE.

9. The method as claimed in claim 8, wherein the auxiliary location information is related to an auxiliary of Global Positioning System (GPS) information and includes at least one of satellite IDs of satellites, almanac data, satellite orbit information, a clock error correction value, an ionosphere correction value, a differential GPS correction value and a list of invisible satellites.

10. The method as claimed in claim 1, wherein when receiving the location of the UE calculated from the VLP, the positioning scheme is a Mobile Station (MS) based scheme of acquiring auxiliary location information calculated from the UE.

11. The method as claimed in claim 10, wherein the auxiliary location information is related to an auxiliary of Global Positioning System (GPS) information and includes at least one of satellite IDs of satellites, almanac data, satellite orbit information, a clock error correction value, an ionosphere correction value, a differential GPS correction value and a list of invisible satellites.

12. The method as claim in claim 1, wherein the positioning scheme is either a UE-assisted scheme or a UE-based scheme, wherein the UE-assisted scheme is performed by calculating auxiliary location information using a measured value received from the UE, and the UE-based scheme is performed by acquiring auxiliary location information calculated from the UE.

13. A method for calculating a location of a user equipment (UE), the method comprising the steps of:
receiving, by a home location platform (HLP), a location request message including specific identifier information of an area in which the UE is located and positioning capability information including positioning schemes which the UE supports, the HLP being a location platform to calculate a location of the UE;
transmitting the specific identifier information received from the UE to a visiting location platform (VLP);
receiving approximate coordinate information of the specific identifier information calculated from the VLP; and
calculating, by the HLP, the location of the UE with the positioning scheme corresponding to the positioning capability information of the UE and the approximate coordinate information received from the VLP.

14. The method as claimed in claim 13, wherein one of the HLP and the VLP is selected as the location platform in response to the location request message of the UE.

15. The method as claimed in claim 13, wherein the HLP determined as the location platform directly receives the positioning capability information provided by the UE and calculates the location of the UE by using the received positioning capability information.

16. The method as claimed in claim 13, wherein the positioning capability information includes a type of network, information indicating if a roaming location service is supported, a supported positioning scheme, a degree of accuracy of the positioning scheme, and an assisted global positioning system (A-GPS) positioning scheme.

17. The method as claimed in claim 13, wherein when receiving the location of the UE calculated by the HLP, the positioning scheme is a Mobile Station (MS) assisted scheme of calculating auxiliary location information using a measured value received from the UE.

18. The method as claimed in claim 17, wherein the auxiliary location information is related to an auxiliary of Global Positioning System (GPS) information and includes at least one of satellite IDs of satellites, almanac data, satellite orbit information, a clock error correction value, an ionosphere correction value, a differential GPS correction value and a list of invisible satellites.

19. The method as claimed in claim 13, wherein when receiving the location of the UE calculated by the HLP, the positioning scheme is an a Mobile Station (MS) based scheme, of acquiring auxiliary location information calculated from the UE.

20. The method as claimed in claim 19, wherein the auxiliary location information is related to an auxiliary of Global Positioning System (GPS) information and includes at least one of satellite IDs of satellites, almanac data, satellite orbit information, a clock error correction value, an ionosphere correction value, a differential GPS correction value and a list of invisible satellites.

21. The method as claim in claim 13, wherein the positioning scheme is either a UE-assisted scheme or a UE-based scheme, wherein the UE-assisted scheme is performed by calculating auxiliary location information using a measured value received from the UE, and the UE-based scheme is performed by acquiring auxiliary location information calculated from the UE.

22. A server for calculating a location of a user equipment (UE), the server comprising:
a receiver for receiving a location request message including specific identifier information and positioning capability information of the UE from the UE in order to determine the location of the UE, receiving a message including positioning capability information of a visiting location platform (VLP) from the VLP, and receiving auxiliary location information from the UE;
a transmitter for transmitting a request message requesting positioning capability information of the VLP to the VLP; and
a controller for determining the VLP of an area in which the UE is located based on the location request message, comparing positioning capability information of the server with positioning capability information of the VLP and determining one of the VLP and the server having a better positioning capability than the other as a location platform (LP), when the server is determined as the LP, exchanging auxiliary location information with the UE without additional communication with the VLP, and calculating the location of the UE using the exchanged auxiliary information.

* * * * *